United States Patent [19]
Hawthorne

[11] 3,959,063
[45] May 25, 1976

[54] METHOD OF PROTECTING A SURFACE FROM A HEAT SOURCE

[75] Inventor: Peter Frederick Hawthorne, Birmingham, England

[73] Assignee: Foseco International Limited, Birmingham, England

[22] Filed: Oct. 1, 1973

[21] Appl. No.: 402,323

Related U.S. Application Data

[62] Division of Ser. No. 252,463, May 11, 1972, abandoned.

[30] Foreign Application Priority Data

June 2, 1971   United Kingdom............... 18637/71

[52] U.S. Cl................................ 156/325; 106/84; 427/239; 427/403; 427/405; 427/419; 428/450
[51] Int. Cl.².................... C09D 1/02; F01D 25/14; F03B 11/02
[58] Field of Search ........... 106/84; 117/70 S, 70 C, 117/129; 264/30; 156/325; 427/403, 405, 419, 239, 230; 428/448, 450, 469, 539

[56] References Cited
UNITED STATES PATENTS

| | | |
|---|---|---|
| 3,093,493 | 6/1963 | von Freyhold........................ 106/84 |
| 3,180,746 | 4/1965 | Patton et al. .......................... 106/84 |
| 3,333,973 | 8/1967 | Freiman................................ 106/84 |
| 3,356,515 | 12/1967 | McGlothlin........................... 106/84 |
| 3,384,510 | 5/1968 | Boggs............................. 117/129 X |
| 3,396,112 | 8/1968 | Burrows................................ 106/84 |
| 3,423,229 | 1/1969 | Kompanek et al..................... 117/62 |
| 3,493,401 | 2/1970 | Schutt et al...................... 106/84 X |
| 3,551,173 | 12/1970 | von Mildenstein ................... 106/84 |
| 3,615,781 | 10/1971 | Schneider et al. .................... 106/84 |
| 3,620,784 | 11/1971 | Schutt................................... 106/84 |
| 3,656,975 | 4/1972 | Phelps et al. ..................... 106/84 X |
| 3,663,290 | 5/1972 | Klinge........................... 117/70 C X |
| 3,776,747 | 12/1973 | Ballard................................. 106/84 |
| 3,830,173 | 8/1974 | Hubble et al. ................... 156/325 X |

FOREIGN PATENTS OR APPLICATIONS

| | | |
|---|---|---|
| 2,049,054 | 4/1971 | Germany ............................ 427/239 |
| 877,202 | 9/1961 | United Kingdom................. 427/239 |

Primary Examiner—Ralph Husack
Attorney, Agent, or Firm—Cushman, Darby & Cushman

[57] ABSTRACT

A method of protecting a surface from a heat source by adhering a refractory heat-insulating material to the surface using an adhesive consisting essentially of 20 – 90% by weight aqueous alkali metal silicate solution 10 – 80% by weight of a powdered metal and up to 15% by weight of a fibrous refractory material.

11 Claims, No Drawings

METHOD OF PROTECTING A SURFACE FROM A HEAT SOURCE

This is a division, of application Ser. No. 252,463 filed May 11, 1972 and now abandoned.

BACKGROUND OF THE INVENTION

This invention relates to high temperature adhesives.

In many applications adhesives are required which can withstand high continuous operating temperatures, e.g. 300°–1000°C. There are very few polymeric adhesive materials which can withstand operating temperatures of over 250°C without degradation, and although some silicone materials are capable of operation at up to 350°C, above this temperature, organic adhesives are insufficient. Inorganic adhesives may be used at higher temperatures, but often a lack of adhesion and a brittleness or loss of adhesive strength develops in time.

SUMMARY OF THE INVENTION

According to a first feature of the present invention there are provided adhesives comprising an aqueous alkali metal silicate solution, and a powdered metal.

DESCRIPTION OF PREFERRED EMBODIMENTS

Preferred silicates are sodium silicates of high $SiO_2$:$Na_2O$ ratio, e.g. of $SiO_2$: $Na_2O$ ratio greater than 3:1. The powdered metal may be, for example, iron, copper, aluminium or an aluminium alloy and these are preferred. Other metals which may be used as zinc, brass, bronze, nickel, cobalt, magnesium, zirconium, titanium, lead, tin, molybdenum, silver, vanadium and tungsten.

The adhesive may also include other materials such as clays (e.g. ball clay, kaolin, bentonite, illite, nontronite, hectorite, attapulgite and others) to give desired consistency or plasticity, and surface active agents to enhance its surface activity. Suitable surface active agents can be selected from the wide variety of materials known per se for such use such as alkyl aryl sulphonates, fatty alcohol sulphates, ethylene oxide condensates and alkali metal salts of such materials. A wide range of suitable surface active agents is commercially available. Particulate refractory materials may also be added if desired, e.g. particulate zircon, silica, alumina, magnesia, zirconia, titania, various aluminosilicates and calcium silicates, grog, calcined clays and chromite flour.

Fibrous refractory materials may be included, for example, alumina, asbestos, calcium silicate or aluminium silicate fibre, quartz fibre or high melting point glass fibres. Commercial forms of these fibres may be used e.g. mineral wool, slag wool, rock wool.

Generally, preferred adhesives have a composition within the following ranges by weight:

| | |
|---|---|
| clay | 0–20% |
| sodium silicate solution: | 20–90% preferably 20–65% |
| refractory fibre | 0–15% |
| powdered metal | 10–80% preferably 10–60% |
| particulate refractory material | 0–20% |
| surface active agent | 0–4% |

The consistency of the adhesive may be varied from a liquid to a thick paste.

The adhesives according to the present invention possess, due to the content of metal powder, a measure of thermal conductivity. This makes them valuable in adhesion applications where heat is required to be transmitted across an adhesive layer joining two components. If a heat-insulative adhesive is used for such a purpose, then a large temperature difference may exist between one face of the adhesive layer and the other, and this may be disadvantageous. The adhesives of the present invention are accordingly of value in attaching sheets, slabs or shapes of thermally insulating material on to metal articles to protect them from damage: examples of such applications are lining gas turbine engine casings and lining waste gas stream converter casings (for example of the type described in our copending application Ser. No. 253,509, filed on even date herewith, now abandoned in favor of Ser. No. 558,653). There are numerous other analogous applications where the adhesives are of value.

In adhering heat insulating materials on to surface using adhesives according to the present invention it is found to be advantageous to prime the surface suitably, in order to increase the bond between the surface and the adhesive layer. A suitable primer for general application is aqueous sodium silicate, optionally containing up to a few percent, by weight, of a surface active agent. The silicate solids content of such a primer may vary, for example, from 9 to 36% by weight, typically about 20%. High $SiO_2$ : $Na_2O$ ratio materials are preferred, e.g. of $SiO_2$ : $Na_2O$ ratio 3.3:1.

For adhesion on to metal surfaces, a primer of particular value is vitreous enamel. This is applied in the customary fashion in the form of a thin coherent layer which bonds very strongly on to the metal. The adhesives of this invention bond very strongly to vitreous enamel surfaces. The improvement in adhesion may be yet further enhanced by etching the vitreous enamel surface or by incorporating into the vitreous enamel surface a mechanical roughening agent. For example, particulate refractory material of particle size greater than the thickness of the enamel layer may be applied to the enamel while the enamel is still molten. On cooling, in place of the usual smooth enamel surface, a rough surface will be obtained. Suitable refractory materials for use in this way include alumina, magnesia, mullite, zirconia and chromic oxide. Naturally, in priming surfaces which are to undergo a temperature change in use, care should be taken to select an enamel of similar thermal expansion coefficient to that of the metal substrate. Such materials are well known and widely used: e.g. for priming austenitic stainless steel substrates, a National Bureau of Standards enamel NBS 331 may be used.

It is to be observed that enamel priming, particularly including coarse refractory as just described, can be used to improve adhesion in other adhesive applications using inorganic adhesives such as silica sol, and not merely those containing metal as in the present invention.

The following example will serve to illustrate teh invention:

EXAMPLE

A primer was made up of (% by weight):

| | |
|---|---|
| aqueous sodium silicate solution (38% by weight solids; $SiO_2$:$Na_2O$ ratio 3.3 : 1) | 55% |
| water | 41% |
| surface active agent | 4% |

The surface active agent was an amphoteric or ampholytic surface active agent of formula

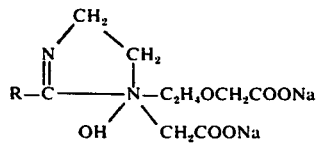

wherein R is a combination of caprylic and ethyl hexoic groups.

Two brush coats of this primer were applied on to the inside of a casing for a gas turbine engine, and allowed to dry.

A refractory heat insulating liner for the engine casing was then coated on its casing-facing surface, with a layer of an adhesive of composition as follows (% by weight):

| | |
|---|---|
| ball clay | 10% |
| aqueous sodium silicate (38% by weight solids; $SiO_2:Na_2O$ ratio 3.3 : 1) | 33.3% |
| amosite asbestos | 7.4% |
| zircon | 2.0% |
| iron powder | 45.3% |
| surface active agent (as in primer) | 2.0% |

The coating applied was about 8 mm thick.

The liner was then pressed into place in the primed casing and the assembly allowed to dry out. A strong bond resulted.

I claim as my invention:

1. In the method of protecting a surface from a heat source by adhering a refractory heat-insulating material to the surface, said method involving the steps of applying an adhesive to the material or surface and then bringing said material and surface together to effect said bonding, the improvement which comprises applying, as the adhesive, one consisting essentially of 20–90% by weight aqueous alkali metal silicate solution, 10–80% by weight of a powdered metal selected from the class consisting of iron, copper, aluminum and aluminum alloys, and an effective amount up to 15% by weight of a fibrous refractory material.

2. The method of claim 1 wherein the surface is first primed with an aqueous alkali metal silicate solution.

3. The method of claim 1 wherein the surface is first primed with a layer of vitreous enamel.

4. The method of claim 3 wherein the vitreous enamel primer layer includes particulate refractory material of average particle size greater than the thickness of the layer.

5. The method of claim 1 wherein the alkali metal silicate of the adhesive is sodium silicate of $SiO_2:Na_2O$ ratio greater than 3:1.

6. The method of claim 1 wherein the adhesive comprises at least some and up to 20% by weight of a clay.

7. The method of claim 1 wherein the adhesive comprises at least some and up to 4% by weight of a surface active agent.

8. The method of claim 1 wherein the adhesive comprises at least some and up to 20% by weight of a particulate refractory material.

9. The method of claim 1 wherein the adhesive consists essentially of the following ingredients in the indicated proportions by weight:

| | |
|---|---|
| clay | at least some and up to 20% |
| sodium silicate solution | 20 – 65% |
| refractory fiber | at least some and up to 15% |
| powdered metal | 10 – 60% |
| particulate refractory material | at least some and up to 20% |
| surface active agent | at least some and up to 4%. |

10. In the method of protecting the inner surfaces of metal casings for gas turbine engines and gas converters by bonding a refractory heat insulating material to said surfaces, said method involving the steps of applying an adhesive to the material or surface and then bringing said material and surface together to effect said bonding, the improvement which comprises applying, as said adhesive, one consisting essentially of 20–90% by weight aqueous alkali metal silicate solution, 10–80% by weight powdered metal selected from the class consisting of iron, copper, aluminum and aluminum alloys, and an effective amount up to 15% by weight of a fibrous refractory material.

11. The method of claim 10 which includes the step, prior to applying the adhesive, of applying a layer of vitreous enamel to the surface to be bonded.

* * * * *